(12) United States Patent
Ramakrishna et al.

(10) Patent No.: US 9,696,875 B2
(45) Date of Patent: *Jul. 4, 2017

(54) MANAGING AN E-MAIL RESPONSE

(71) Applicant: International Business Machines Corporation, Armonk, NY (US)

(72) Inventors: Avinash V. Ramakrishna, Irving, TX (US); Shishir Saha, Bangalore (IN); Aparna Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,074

(22) Filed: Jun. 7, 2016

(65) Prior Publication Data

US 2017/0075518 A1 Mar. 16, 2017

Related U.S. Application Data

(63) Continuation of application No. 15/040,251, filed on Feb. 10, 2016, now Pat. No. 9,419,932, which is a continuation of application No. 14/852,948, filed on Sep. 14, 2015.

(51) Int. Cl.
*G06F 3/00* (2006.01)
*G06F 3/0482* (2013.01)
*H04L 12/58* (2006.01)
*G06F 3/0484* (2013.01)

(52) U.S. Cl.
CPC ........ *G06F 3/0482* (2013.01); *G06F 3/04842* (2013.01); *H04L 51/04* (2013.01); *H04L 51/28* (2013.01)

(58) Field of Classification Search
None
See application file for complete search history.

(56) References Cited

U.S. PATENT DOCUMENTS

| 8,055,718 | B2 | 11/2011 | Slaybers |
| 8,606,864 | B2 | 12/2013 | Buchheit |
| 2004/0078488 | A1* | 4/2004 | Patrick .................... H04L 51/28 709/245 |
| 2007/0050456 | A1 | 3/2007 | Vuong et al. |
| 2011/0154221 | A1 | 6/2011 | DeLuca et al. |

OTHER PUBLICATIONS

IBM: List of IBM Patents or Patent Applications Treated as Related (Appendix P), Nov. 11, 2016, pp. 1-2.
Ramakrishna et al., Pending U.S. Appl. No. 14/852,948, filed Sep. 14, 2015, titled "Managing an E-Mail Response," pp. 1-35.
Ramakrishna et al., Pending U.S. Appl. No. 15/040,251, filed Feb. 10, 2016, titled "Managing an E-Mail Response," pp. 1-30.

* cited by examiner

*Primary Examiner* — Alvin Tan
*Assistant Examiner* — Ayesha Huertas Torres
(74) *Attorney, Agent, or Firm* — Reza Sarbakhsh

(57) ABSTRACT

A method for managing an e-mail response based on the e-mail domains of the recipients is provided. The method receives a first e-mail sent to a plurality of e-mail addresses that includes e-mails with different domain names, provides a list of different domain names associated with a plurality of e-mail addresses and an e-mail address of a sender of the first e-mail, generates, based on a selection of one or more of the different domain names, a distribution list including one or more e-mail addresses limited to e-mail addresses having a selected domain name, and providing the distribution list in an addressee field associated with the e-mail response.

1 Claim, 5 Drawing Sheets

100

| | | |
|---|---|---|
| 101 | From: | LastName1@client.com |
| 102 | To: | Consultant1@company.com, Consultant2@company.com |
| 103 | Cc: | LastName2@client.com, LastName3@client.com, LastName11@partner.com, Consultant3@company.com, LastName12@partner.com, Engineer1@company.com, Engineer2@company.com |
| 104 | Date: | 08/20/2015 03:51PM |
| 105 | Subject: | Issue 123 |
| 106 | | Does issue 123 need a product fix? |

| | | | |
|---|---|---|---|
| 201 | To: | | Select Domain(s)  211 |
| 202 | Cc: | | Select Domain(s)  212 |
| 203 | Bcc: | | Select Domain(s)  213 |
| 205 | Subject: | RE Issue 123 | |
| 206 | [Enter text here] | | |

FIG. 2A

MANAGING AN E-MAIL RESPONSE

BACKGROUND

The present invention generally relates to managing an e-mail response, and more particularly to managing an e-mail response based on the e-mail domains of recipients.

In general, an e-mail address may include a local part and a domain part, which are separated by an "@" symbol. For example, in the following e-mail address, "Consultant1_LastName1@company.com," "Consultant1_LastName1" is the local part and "company.com" is the domain part (also known as the domain name). An e-mail message sent to an e-mail address may be directed to a location, e.g., a mailbox, on an e-mail server associated with the e-mail address. A user associated with the e-mail address may access the e-mail message by, e.g., retrieving the message from the e-mail server with an e-mail application that may be on the user's device, e.g., the user's computer.

An e-mail message may be sent to multiple recipients or addressees. A recipient may respond to the e-mail message in a variety of ways including by replying to the sender of the e-mail, replying to all recipients and the sender, replying to less than all recipients and the sender, replying to all recipients and the sender and including other recipients, and forwarding to other recipients. Certain ways of responding to an e-mail message are automated in the sense that the addressee fields in a graphical user interface (GUI) may be auto-populated based on the type of response. For example, a "Reply to sender" command may auto-populate an addressee field with the sender's e-mail address, and a "Reply to all" command may auto-populate an addressee field with the sender's e-mail address and the e-mail addresses of all the recipients of the initial e-mail message. Other ways of responding to the e-mail message may require manual insertion and/or deletion of e-mail addresses.

SUMMARY

According to one embodiment, a method for managing an e-mail response is provided. The method may include receiving a first e-mail from a sender sent to a plurality of e-mail addresses that includes two or more e-mail addresses having different domain names, initiating a graphical user interface (GUI) associated with the e-mail response, providing a list of the different domain names associated with the plurality of e-mail addresses and an e-mail address associated with the sender, generating, based on a selection of one or more of the different domain names, a distribution list comprising one or more e-mail addresses limited to e-mail addresses having a selected domain, and providing the distribution list in an addressee field associated with the e-mail response in the GUI.

According to another embodiment, a computer program product for managing an e-mail response is provided. The computer program product may include at least one computer readable non-transitory storage medium having computer readable program instructions for execution by a processor. The computer readable program instructions include instructions for receiving a first e-mail sent to a plurality of e-mail addresses that includes two or more e-mail addresses having different domain names, initiating a GUI associated with the e-mail response, providing a list of the different domain names associated with the plurality of e-mail addresses and an e-mail address associated with a sender of the first e-mail, generating, based on a selection of one or more of the different domain names, a distribution list comprising one or more e-mail addresses limited to e-mail addresses having a selected domain, and providing the distribution list in an addressee field associated with the e-mail response in the GUI.

According to another embodiment, a computer system for managing an e-mail is provided. The system may include at least one processor, at least one computer readable memory, at least one computer readable tangible, non-transitory storage medium, and program instructions stored on the at least one computer readable tangible, non-transitory storage medium for execution by the at least one processor via the at least one computer readable memory. The program instructions include instructions for receiving a first e-mail sent to a plurality of e-mail addresses that includes two or more e-mail addresses having different domain names, initiating a GUI associated with the e-mail response, providing a list of the different domain names associated with the plurality of e-mail addresses and an e-mail address associated with a sender of the first e-mail, generating, based on a selection of one or more of the different domain names, a distribution list comprising one or more e-mail addresses limited to e-mail addresses having a selected domain, and providing the distribution list in an addressee field associated with the e-mail response in the GUI.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which:

FIG. 1 illustrates an exemplary graphical user interface associated with a received e-mail, according to an embodiment;

FIGS. 2A-2C illustrate an exemplary graphical user interface associated with an e-mail response message, according to an embodiment;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 2B:

Various embodiments of the present invention will now be discussed with reference to FIGS. 1-5, like numerals being used for like and corresponding parts of the various drawings.

According to one embodiment, provided is a method for managing an e-mail response that is responsive to a first e-mail message sent to a plurality of e-mail addresses including two or more e-mail addresses having different domain names by initiating a graphical user interface (GUI) associated with the e-mail response, providing a list of different domain names associated with the plurality of e-mail addresses, generating, based on a selection of one or more of the different domain names, a distribution list comprising one or more e-mail addresses having a selected domain name, and providing the distribution list in an addressee field associated with the e-mail response in the GUI. The method, computer program products, and systems disclosed herein may allow a user to quickly and efficiently create a distribution list that may be a subset of the e-mail recipients and the sender based on the domain names of the e-mail addresses of a received e-mail message.

FIG. 1 illustrates an exemplary GUI associated with a received e-mail message (reception GUI 100), according to an embodiment. Reception GUI 100 may include details about the received e-mail message, such as sender information, e.g., provided in a sender information area 101, recipient information, e.g., provided in a primary recipient area 102, and a secondary recipient area 103, reception date, e.g., provided in a date area 104, a subject heading, e.g., provided in a subject area 105, and body text, e.g., provided in a body text area 106. In this illustration, the primary recipient area 102 includes two e-mail addresses with the same domain name (company.com), the secondary recipient area 103 (depicted as a carbon copy or "Cc" area) includes multiple e-mail addresses with three different domain names, e.g., for a company, a client, and a partner company (company.com, client.com, partner.com).

The received e-mail message may be sent to a user's e-mail box, which the user may access and/or view with an application (e.g., an e-mail application) on the user's device, which may include a computer workstation, mobile device, etc. Reception GUI 100 may be part of the e-mail application used to access and/or view the received e-mail message. According to an embodiment, the user may use the e-mail application to respond to the received e-mail message, for example, by replying directly to the sender, replying to all (including the sender and all recipients, e.g., listed in the primary recipient area 102 and secondary recipient area 103), or replying to a subset of the sender and recipients. The user may also add additional recipients or the user may forward the received e-mail message to any combination of recipients (including the sender, recipients, and/or additional recipients). Upon the user's command to respond to the received e-mail, either by replying or forwarding the received e-mail, a GUI may be initiated that will serve as an interface to compose and direct (i.e., address) an e-mail response.

FIG. 2A illustrates an exemplary GUI associated with an e-mail response (response GUI 200), according to an embodiment. Response GUI 200 may be initiated in response to a received e-mail message. In one embodiment, response GUI 200 may allow a user, e.g., a recipient of the e-mail, such as "Consultant1@company.com" depicted in FIG. 1, to prepare and address an e-mail that is responsive to the received e-mail (for example, as a reply to the sender, as a reply to all recipients and the sender, as a reply to a subset of all recipients and the sender, as a combination of any of the preceding reply formats along with additional recipients, or as a forward to other recipients).

Response GUI 200 may include a primary addressee field 201, a secondary addressee field 202 (e.g., Cc field), a tertiary addressee field 203 (e.g., a blind carbon copy or "Bcc" field), a subject field 205, and a body text field 206. Response GUI 200 may also include one or more dropdown menus listing each of the different domain names among all of the e-mail recipients and sender of the received e-mail message. A dropdown menu may be provided for each of the addressee fields in response GUI 200. Primary dropdown menu 211 may be associated with primary addressee field 201. Secondary dropdown menu 212 may be associated with secondary addressee field 202. Tertiary dropdown menu 213 may be associated with tertiary addressee field 203. The dropdown menus may list the different domain names upon an activation stimulus, such as positioning a cursor over an icon associated with the dropdown menu, e.g., "rolling over" the icon for the dropdown menu, or by clicking on the icon associated with the dropdown menu.

FIG. 2B illustrates response GUI 200 with primary dropdown menu 211 activated. In this illustration, activated primary dropdown menu 211' lists the different domain names among the recipients and sender of the received e-mail, e.g., a first domain name 221 (client.com), a second domain name 222 (company.com), and a third domain name 223 (partner.com). The second domain name 222 may be selected. In response to the selection, the primary addressee field 201 may be populated with all of the e-mail addresses among the recipients and sender having a domain name corresponding to the second domain name 222 (e.g., company.com). The user may then send the e-mail response, e.g., to the e-mail addresses having the second domain name 222.

Alternatively, the user may select further domain names from the primary dropdown menu 211, and in response to such further selection(s), the primary addressee field 201 is populated with e-mail addresses among the recipients and sender having a domain name corresponding to the further selected domain name(s). It will be appreciated that the user may also manually enter other e-mail addresses into the primary addressee field 201 (or any of the other addressee fields), for example, by entering the characters of the other e-mail addresses into the desired addressee field or by selecting the other e-mail addresses from contact list or address book. It will also be appreciated that the user may manually delete any of the e-mail addresses provided in the addressee field(s).

Figure 2C:
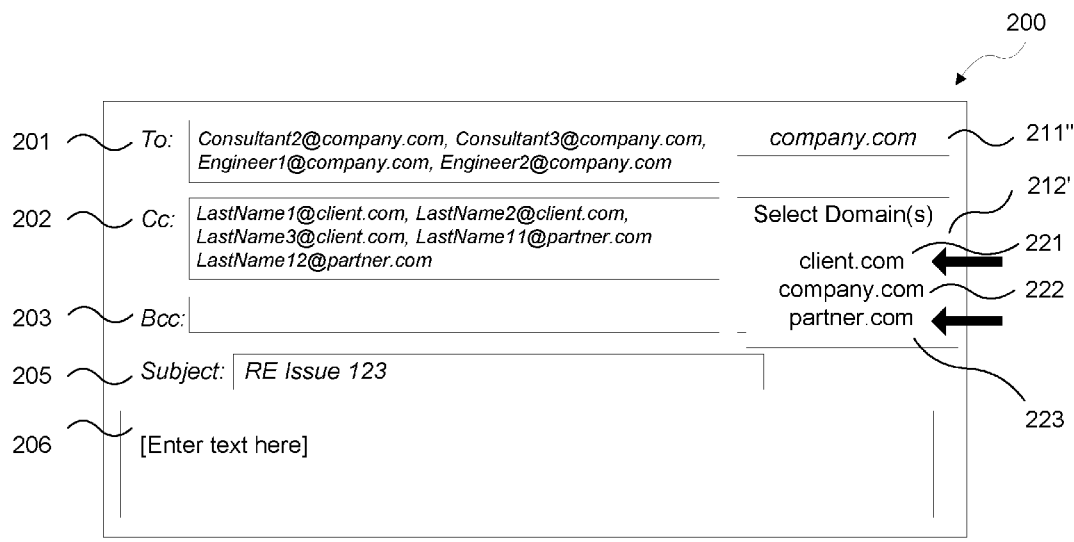

FIG. 2C illustrates response GUI 200 with secondary dropdown menu 212 activated. It will be appreciated that the selection depicted in FIG. 2B is maintained in FIG. 2C for illustrative purposes. That is, primary addressee field 201 remains populated with the e-mail addresses having the second domain name 222 (e.g., company.com). Also, in this embodiment, primary dropdown menu 211 has changed to a post-activated dropdown menu 211", which may list the selected domain names from activated primary dropdown menu 211'. In this illustration, the post-activated dropdown menu 211" indicates that the second domain name 222 (company.com) has been selected. In other embodiments, the dropdown menus may appear identical before and after a selection has been made. That is, in some embodiments, the activated dropdown menu returns to the appearance of the "pre-activated" dropdown menu and does not transition to a post-activated dropdown menu.

With continuing reference to FIG. 2C, activated secondary dropdown menu 212' may list the different domain names among the recipients and sender of the received e-mail, e.g., a first domain name 221 (client.com), a second domain name 222 (company.com), and a third domain name 223 (partner.com). In other embodiments, one or more of the domain names may be grayed out or removed from the dropdown menu depending on whether those domain names have been previously selected from another dropdown menu. For example, in one embodiment following the selection depicted in FIG. 2B (where the second domain name 222 has been selected from the activated primary dropdown menu 211') the listing of domain names in activated secondary dropdown menu 212' may have the second domain name 222 grayed out or omitted. Preventing selection of a previously selected domain (from a separate dropdown menu) may prevent duplication of e-mail messages sent to the same recipient(s), e.g., as a primary addressee recipient and a secondary addressee recipient, which may avoid unnecessary storage of duplicative e-mail messages (and associated data or attached files).

Referring back to FIG. 2C, in this illustration, the first domain name 221 and third domain name 223 are selected, and in response, the secondary addressee field 202 is populated with all of the e-mail addresses among the recipients and sender having a domain name corresponding to the first domain name 221 (e.g., client.com) and the third domain name 223 (e.g., partner.com). It will be appreciated that procedures similar to those described above may be used to populate the remaining addressee fields, e.g., the tertiary addressee field 203.

Figure 3:
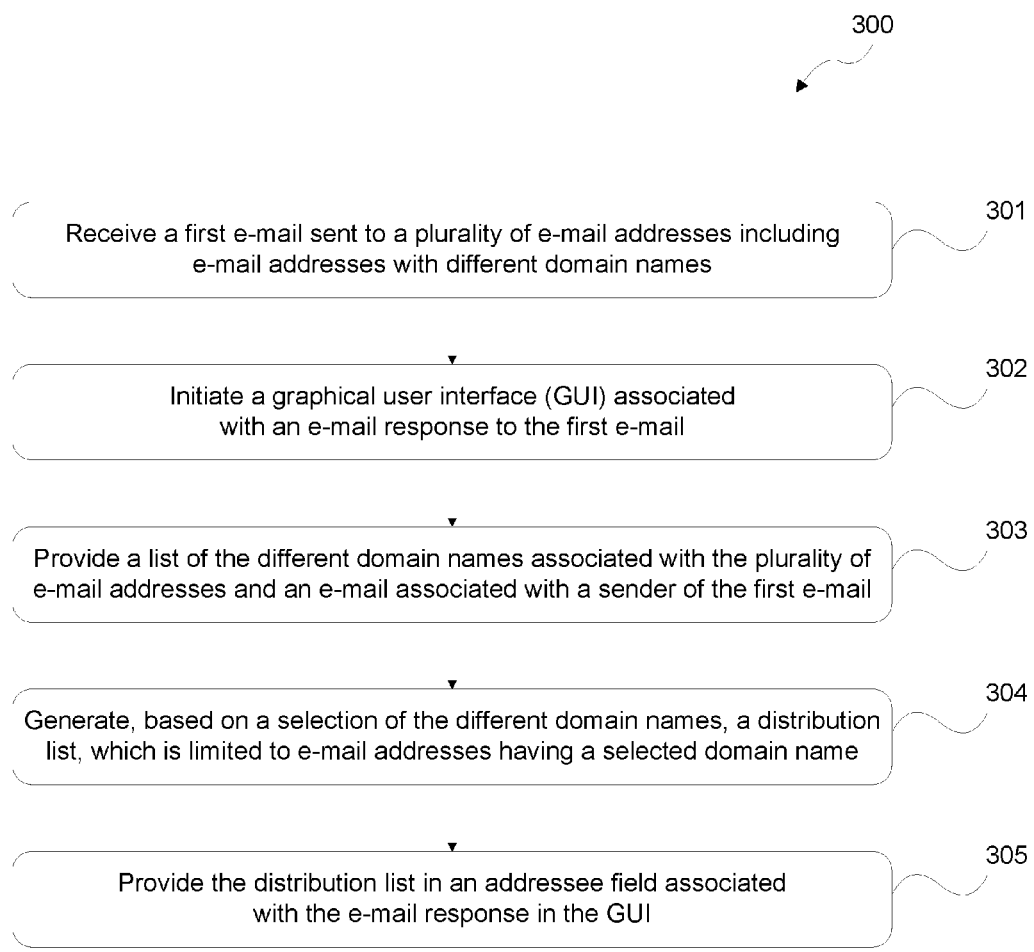
FIG. 3 is a flowchart illustrating a method for managing an e-mail response, according to an embodiment.

FIG. 3 is a flowchart illustrating an exemplary method 300 for managing an e-mail response, according to an embodiment. At 301, a first e-mail message from a sender is received, e.g., by an e-mail server or accessed by an e-mail application on a user's device. The first e-mail message may be sent to a plurality of e-mail addresses. Each e-mail address includes a domain name and, among the plurality of e-mail addresses, two or more e-mail addresses have different domain names.

At 302, a GUI associated with an e-mail response (responsive to the first e-mail message) is initiated, for example, by an e-mail application on a user's device. In one embodiment, a GUI associated with the received e-mail message may include an option to initiate the GUI associated with the e-mail response, for example, via a reply button or the like. The GUI associated with the e-mail response may include one or more addressee fields, e.g., a primary addressee field, a secondary addressee field, a tertiary addressee field, and so on. In one embodiment, the primary addressee field is a "To" field, the secondary addressee field is a "Cc" field, and the tertiary addressee field is a "Bcc" field. The GUI associated with the e-mail response may also include a subject field and text body field.

At 303, a list of the different domain names associated with the plurality of e-mail addresses and the sender (i.e., an e-mail address associated with the sender) is provided. In one embodiment, the list of the different domain names is provided as a dropdown menu, e.g., that is part of the GUI associated with the e-mail response. It is contemplated that the list of different domain names may be provided as any known or contemplated type of user interface mode that is part of the GUI associated with the e-mail response. In one embodiment, the list of different domain names is provided as a user interface including one or more checkboxes.

At 304, based on a selection, e.g., by the user, of one or more of the different domain names, a distribution list is generated. The distribution list comprises one or more e-mail addresses limited to e-mail addresses having a selected domain name. The term "a selected domain name" may include multiple selected domain names. For example, referring back to FIG. 2C, the first domain name 221 (company.com) and the third domain name 223 (partner.com) may be selected (e.g., to populate the secondary addressee field 202) and as such, in this example, each of the first domain name 221 and the third domain name 223 may be considered a selected domain name.

At 305, the distribution list is provided in an addressee field associated with the e-mail response in the GUI associated with the e-mail response. For example, a list of different domain names may be associated with a primary addressee field. Upon a selection of one or more different domain names, the primary addressee field becomes populated with all of the e-mail addresses among the plurality of e-mail addresses from the first e-mail and the first e-mail sender's e-mail address, having a selected domain name. In one embodiment, the addressee field is selected among the group consisting of a primary addressee field, a secondary addressee field, and a tertiary addressee field.

In one embodiment, the GUI associated with the e-mail response may include a plurality of addressee fields and a plurality of dropdown menus respectively associated with each of the addressee fields. That is, for each addressee field, the GUI includes a respective dropdown menu listing the different domain names. Upon a selection of one or more different domain names, a distribution list (including e-mail addresses having a selected domain name) is provided in one of the addressee fields from the plurality of addressee fields associated with a dropdown menu from which the selection of one or more of the different domain names is made.

In one embodiment, the GUI may include a subject field and the method may include appending text to the subject field based on the selected domain name. For example and referring back to FIG. 2B, an e-mail response (from a recipient with an e-mail address having the second domain name 222 (company.com)) may be addressed to only internal e-mail addresses, e.g., e-mail addresses having the second domain name 222 (company.com). Based on the selection of only the internal e-mail addresses as recipients, the subject listed in the subject field 205 may be appended with pertinent text, such as "CONFIDENTIAL" or "INTERNAL".

Figure 4A:
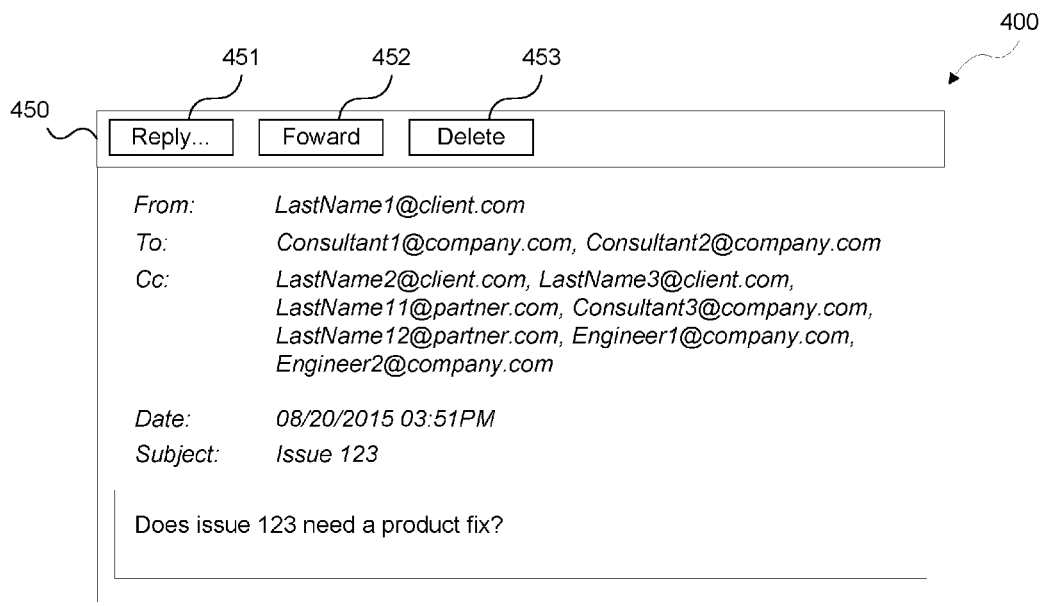
FIGS. 4A and 4B illustrate another exemplary graphical user interface associated with a received e-mail, according to an embodiment.

FIG. 4A illustrates another exemplary GUI associated with a received e-mail message (other reception GUI 400), according to an embodiment. Similar to reception GUI 100 (depicted in FIG. 1), other reception GUI 400 may include details about the received e-mail message (such as sender and recipient information, etc.) and may also include a command bar 450, which may include one or more icons associated with a command function. For example, the command bar 450 may include a reply button 451, which may be associated with replying to the received e-mail message, a forwarding button 452, which may be associated with forwarding the received e-mail message, and a delete button 453, which may be associated with deleting the received e-mail message. It will be appreciated that any or all of the command icons/buttons may be provided with or without the command bar 450. In one embodiment, one or more of the command icons/buttons functions as a dropdown menu listing a sub-list of command functions. In one embodiment, the reply button 451 functions as a dropdown menu.

Figure 4B:
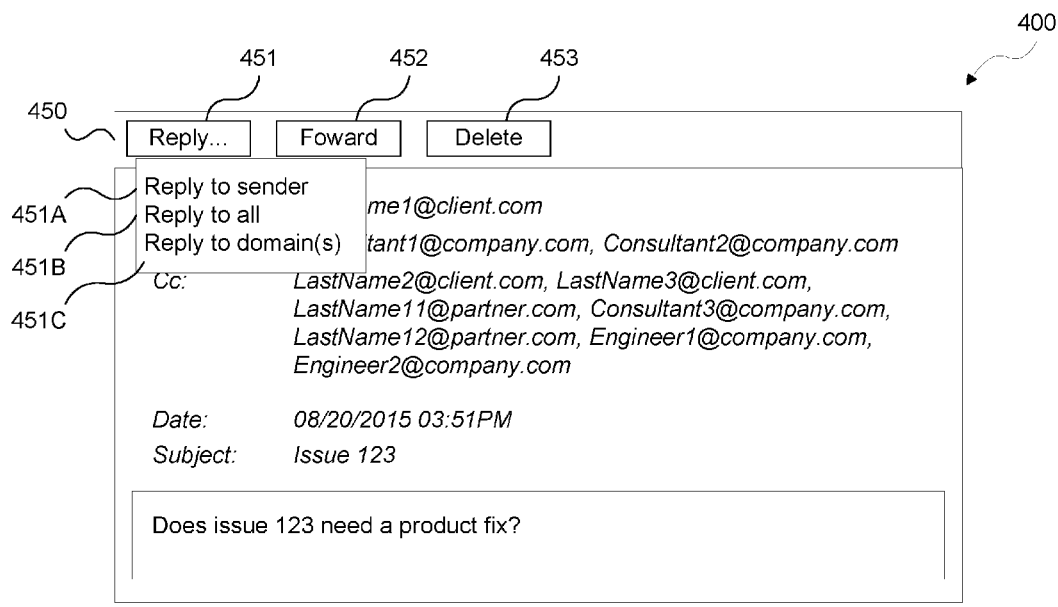

FIG. 4B illustrates other reception GUI 400 with reply button 451 as an activated dropdown menu. In this illustration, activated reply button 451' lists different types of reply functions that may be initiated, e.g., reply to sender 451A, reply to all 451B, reply to domain(s) 451C. Upon selection of a type of reply function, the e-mail application may initiate a GUI associated with the selected type of reply function. In one embodiment, the reply to domain(s) 451C function may initiate response GUI 200 (depicted in FIGS. 2A-2C).

In one embodiment, the GUI associated with the e-mail response is initiated based on a selection in a GUI associated with reception of the first e-mail.

In one embodiment, the method includes receiving a second e-mail sent to a further plurality of e-mail addresses and the second e-mail is subsequent to the first e-mail in an e-mail chain, and wherein the further plurality of e-mail addresses includes one or more additional e-mail addresses, and the distribution list includes one or more of the additional e-mail addresses having the selected domain name. For example, the method considers the scenario when one or more additional e-mail addresses are added to the e-mail chain. Those additional e-mail addresses may be accounted for when a domain name is selected to prepare a distribution list. In other words, new addresses may be automatically included in the distribution list, as long as those new addresses have a selected domain.

In one embodiment, the further plurality of e-mail addresses (in the second e-mail) includes one or more additional different domain names, the list of different domain names associated with the plurality of e-mail addresses includes the one or more additional different domain names, and the selected domain name is selected among the one or more different domain names and the one or more additional different domain names. For example, the method considers the scenario when the additional e-mail addresses added to the e-mail chain have new domain names. Those new (i.e., additional different) domain names may be accounted for when the list of different domain names is provided.

In one embodiment, the first e-mail is a subsequent e-mail in an e-mail chain comprising one or more previous e-mails. The one or more previous e-mails include one or more previously removed e-mail addresses, and the distribution list includes one or more of the previously removed e-mail addresses having the selected domain. For example, all of the e-mail addresses in an e-mail chain (including those that may have been deleted from the e-mail chain) may be considered when generating the distribution list.

In one embodiment, the one or more previously removed e-mail addresses (from the one or more previous e-mails in the e-mail chain) each has a domain that is different from the different domain names associated with the plurality of e-mail addresses (from the first e-mail), and the list of the different domain names associated with the plurality of e-mail addresses includes one or more earlier domains. For example, all of the e-mail addresses in an e-mail chain may be considered when providing the list of the different domain names.

In another embodiment, only the e-mail addresses in the last e-mail message in the e-mail chain are considered when providing the list of different domain names and when generating the distribution list.

In another aspect, the method includes receiving a first e-mail from a sender sent to a plurality of e-mail addresses, with each e-mail address having a domain name, and two or more of the e-mail addresses have different domain names, providing a list of the different domain names associated with the plurality of e-mail addresses and an e-mail address associated with the sender, and generating, based on a selection of one or more of the different domain names, a distribution list, with the distribution list comprising one or more e-mail addresses limited to e-mail addresses having a selected domain name.

The methods, computer program products, and systems disclosed herein may be useful in a scenario involving e-mail messages to (or e-mail chains including) recipients from multiple companies/entities. For example, an employee of a client may send an e-mail inquiry to employees at a vendor company, as well as other employees at the client and employees at a partner company. Recipient at the vendor company may wish to correspond with only employees of the vendor company (e.g., for an internal discussion). Instead of manually removing unintended recipients, the methods disclosed herein may allow the recipient at the vendor company to quickly and efficiently sort and select the intended e-mail addresses by their associated domain names.

Figure 5:
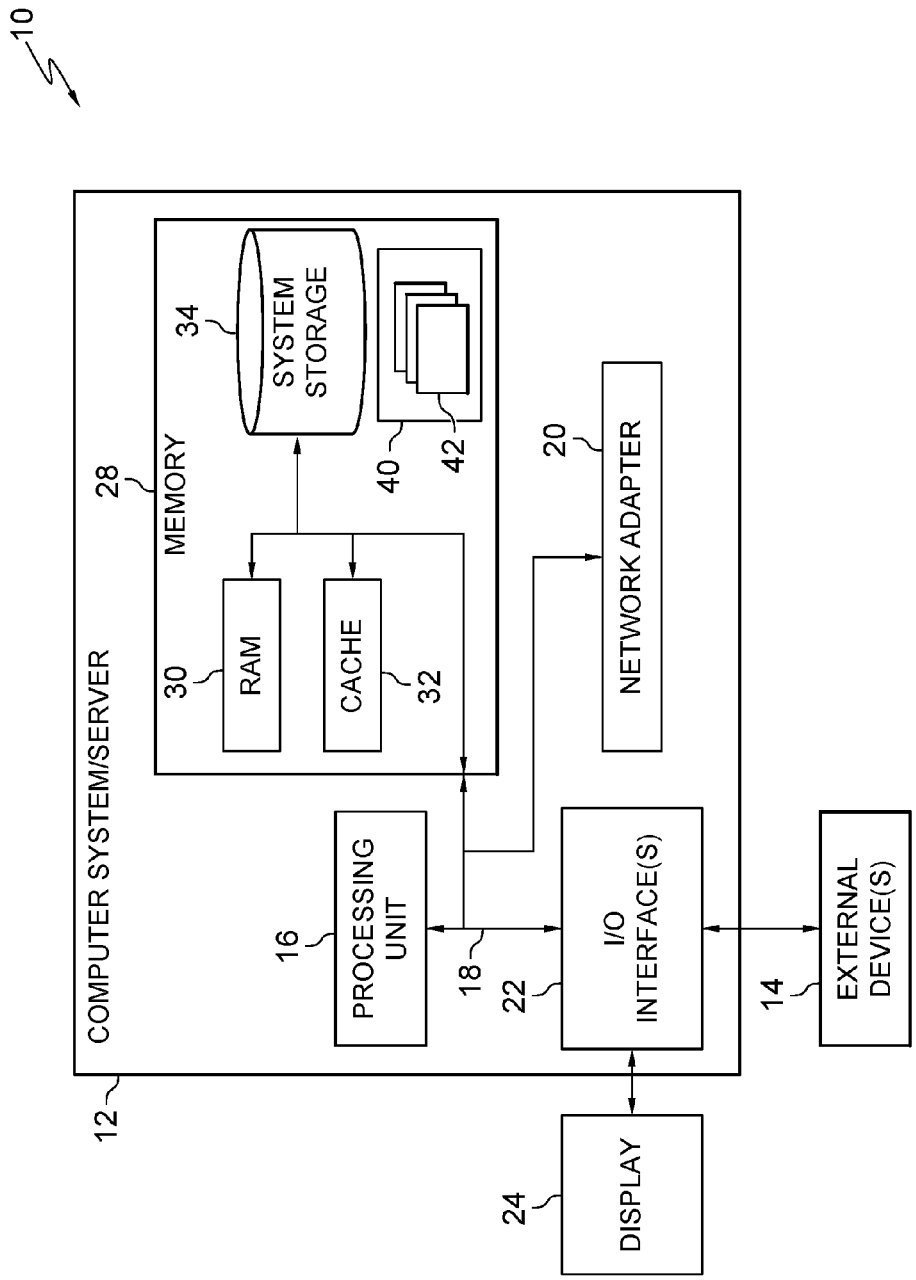
FIG. 5 is a block diagram illustrating a computing node, according to an aspect of the invention.

FIG. 5 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing an e-mail response, comprising a non-transitory tangible storage device having program code embodied therewith, the program code executable by a processor of a computer to perform a method, the method comprising:

receiving, by the processor, a first e-mail from a sender sent to a plurality of e-mail addresses, wherein each e-mail address from the plurality of e-mail addresses includes a domain name, and wherein two or more of the e-mail addresses from the plurality of e-mail addresses have different domain names;

initiating, by the processor, a graphical user interface (GUI) associated with the e-mail response, wherein the GUI includes a subject field, a plurality of addressee fields and a plurality of dropdown menus respectively associated with each addressee field from the plurality of addressee fields;

providing, by the processor, in each dropdown menu from the plurality of dropdown menus, a list of the different domain names associated with the plurality of e-mail addresses and an e-mail address associated with the sender;

generating, by the processor, based on a selection of one or more of the different domain names, a distribution list, wherein the distribution list comprises one or more e-mail addresses limited to e-mail addresses having a selected domain name;

providing, by the processor, the distribution list in one of the addressee fields from the plurality of addressee fields associated with a dropdown menu from which the selection of one or more of the different domain names is made; and appending, by the processor, text to the subject field based on the selected domain name, wherein the text identifies an internal discussion, and wherein the e-mail response is from a recipient having an e-mail address with the selected domain name.

* * * * *